(12) United States Patent  (10) Patent No.: US 9,233,727 B1
Imamura  (45) Date of Patent: Jan. 12, 2016

(54) SADDLE TYPE VEHICLE (71) Applicant: YAMAHA HATSUDOKI KABUSHIKI KAISHA, Iwata-shi, Shizuoka (JP)

(72) Inventor: Mitsutoshi Imamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/560,030

(22) Filed: Dec. 4, 2014

(30) Foreign Application Priority Data

Jul. 2, 2014 (JP) ................. 2014-136635

(51) Int. Cl.
B62D 25/18 (2006.01)
B62J 15/02 (2006.01)
B62J 15/04 (2006.01)

(52) U.S. Cl.
CPC . *B62J 15/02* (2013.01); *B62J 15/04* (2013.01)

(58) Field of Classification Search
CPC ............ B62J 15/02; B62J 15/04; B62J 15/00
USPC .................. 280/152.1, 152.2, 152.3, 847
See application file for complete search history.

(56) References Cited

U.S. PATENT DOCUMENTS

| 750,386 | A | * | 1/1904 | Neinens et al. | 280/152.3 |
| 1,034,067 | A | * | 7/1912 | Birt, Jr. | B62J 15/04 |
| | | | | | 280/152.1 |
| 4,485,884 | A | * | 12/1984 | Fukunaga et al. | 180/219 |
| 5,961,136 | A | * | 10/1999 | Tseng | B62J 15/02 |
| | | | | | 224/453 |
| 6,073,948 | A | * | 6/2000 | Motojima et al. | 280/152.2 |
| 6,695,330 | B2 | * | 2/2004 | Hata | B62K 11/00 |
| | | | | | 180/219 |
| 7,331,593 | B2 | * | 2/2008 | Okabe | B62J 1/12 |
| | | | | | 180/219 |
| 7,641,238 | B2 | * | 1/2010 | Fujimoto | B62J 15/00 |
| | | | | | 280/851 |
| 7,766,355 | B2 | * | 8/2010 | Ichihara | B62J 15/00 |
| | | | | | 180/219 |
| 8,016,307 | B2 | * | 9/2011 | Adachi et al. | 280/152.1 |
| 8,016,308 | B2 | * | 9/2011 | Ishikawa | B62J 6/18 |
| | | | | | 280/152.1 |
| 8,317,212 | B2 | * | 11/2012 | Kobayashi et al. | 280/152.1 |
| 8,459,393 | B2 | * | 6/2013 | Yamamoto | B62J 15/00 |
| | | | | | 180/219 |
| 8,499,878 | B2 | * | 8/2013 | Yamakura | B62J 6/005 |
| | | | | | 180/219 |
| 8,596,400 | B2 | * | 12/2013 | Muroo | B62J 21/00 |
| | | | | | 180/219 |
| 8,657,317 | B2 | * | 2/2014 | Syu | B62J 15/02 |
| | | | | | 280/152.1 |
| 8,979,132 | B2 | * | 3/2015 | Matsushima et al. | 280/852 |
| 2007/0045023 | A1 | * | 3/2007 | Okabe et al. | 180/218 |
| 2007/0046016 | A1 | * | 3/2007 | Fujimoto et al. | 280/847 |
| 2008/0308331 | A1 | * | 12/2008 | Trunkenpolz | B62K 19/30 |
| | | | | | 180/68.3 |
| 2009/0008893 | A1 | * | 1/2009 | Ishikawa et al. | 280/152.3 |
| 2009/0079156 | A1 | * | 3/2009 | Ichihara | 280/152.1 |
| 2010/0096825 | A1 | * | 4/2010 | Nagao et al. | 280/152.05 |

(Continued)

FOREIGN PATENT DOCUMENTS

JP 2011-054335 A 3/2011

*Primary Examiner* — Brodie Follman
*Assistant Examiner* — Brian Cassidy
(74) *Attorney, Agent, or Firm* — Keating and Bennett, LLP (57) ABSTRACT In a saddle-type vehicle, a first mudguard member is made from resin, and a second mudguard member, made from resin, is a separate component from the first mudguard member. The second mudguard member is attached to the first mudguard member below the first mudguard member. A head of a bolt is sandwiched between the first mudguard member and the second mudguard member. A male screw of the bolt protrudes upward from the first mudguard member. A plurality of nuts, each mutually separate components, include a locking mechanism. The plurality of nuts are tightened onto the male screws of the bolts above an attaching portion to secure a mudguard unit to the attaching portion.

7 Claims, 7 Drawing Sheets

(56) References Cited

U.S. PATENT DOCUMENTS

| | | | |
|---|---|---|---|
| 2010/0194149 A1* | 8/2010 | Yamamoto | 296/198 |
| 2012/0073893 A1* | 3/2012 | Muroo et al. | 180/311 |
| 2012/0188777 A1* | 7/2012 | Hamauzu | B62J 15/00 362/473 |
| 2013/0313861 A1* | 11/2013 | Koyama | B62J 15/00 296/198 |

* cited by examiner

SADDLE TYPE VEHICLE

BACKGROUND OF THE INVENTION

1. Field of the Invention

The present invention relates to saddle type vehicles.

2. Description of the Related Art

There are saddle-type vehicles equipped with mudguards. For example, the motorcycle described in Japanese Patent Laid-open Patent Publication No. 2011-54335 is equipped with a second rear fender, which acts as a mudguard, and the second rear fender is attached at the rear of the vehicle.

There is a concern that a mudguard has less rigidity when the mudguard is made of resin. However, a highly rigid mudguard is preferable because the mudguard is cantilevered when installed on the vehicle body.

The rigidity of the mudguard may be improved by constructing the mudguard from a plurality of segments. However, there is a concern that the ease of assembly declines when the mudguard is divided into a plurality of segments. Thus, in terms of ease of assembly, the mudguard is preferably attached to or removed from the vehicle body in one piece even if the mudguard is constructed from a plurality of segments.

Moreover, nuts and bolts are generally used to attach a mudguard to a vehicle body. In a nut-and-bolt configuration, a plurality of nuts may be welded to a stay or the like, and the combined assembly is attached to the mudguard. When this kind of combined assembly is used, a bolt is threaded into a nut using a tool. Furthermore, a nut with a locking mechanism is desired to attach the mudguard to the vehicle body. However, the locking mechanism cannot be used in the above-described configuration where the plurality of nuts are welded to a stay because the locking mechanism would be affected by heat during welding, thus the nuts would need to be attached separately. If the nuts are attached separately beneath the vehicle body, a tool used to hold or turn the nuts needs to have access to the nuts from below. However, the rear wheel situated beneath the mudguard blocks access to the nuts.

SUMMARY OF THE INVENTION

Preferred embodiments of the present invention provide a saddle type vehicle equipped with a highly rigid mudguard that is attached to and removed from the vehicle body in one piece, wherein the attaching and removing of the mudguard is easily performed even when a nut with a locking mechanism is used.

A saddle type vehicle according to a preferred embodiment of the present invention includes a rear wheel, a vehicle frame, a mudguard unit, and a plurality of nuts. The vehicle frame is arranged above the rear wheel in a side view of the vehicle. The mudguard unit is arranged above the rear wheel and is attached to the vehicle frame. The plurality of nuts secure the mudguard unit to the vehicle frame.

The mudguard unit preferably includes a first mudguard member, a second mudguard member, and a plurality of bolts. The first mudguard member is preferably made from resin. The second mudguard member, preferably made from resin, is a separate component from the first mudguard member. The second mudguard member is attached to the first mudguard member below the first mudguard member.

The plurality of bolts include a head and a male screw. The head is sandwiched between the first mudguard member and the second mudguard member. The male screw protrudes upward from the first mudguard member. The vehicle frame includes an attaching portion provided with a plurality of holes through which the plurality of bolts pass. A plurality of nuts, each mutually separate components, include locking mechanisms. The plurality of nuts are tightened onto the male screws of the bolts above the attaching portion to secure the mudguard unit to the attaching portion.

Therefore, the mudguard unit is vertically divided into the first mudguard member and the second mudguard member. The vertically divided construction improves the rigidity of the mudguard unit.

Furthermore, the male screws of the bolts protrude upward from the first mudguard member to attach the second mudguard member to the first mudguard member. Therefore, the mudguard unit is attached or removed in one piece by fastening or releasing the bolts and the nuts.

Moreover, the bolts are accessed from above the bolts since the nuts are tightened onto the male screws of the bolts above the attaching portion. Therefore, the rear wheel does not impede attachment, thus improving the efficiency of attaching or removing the mudguard. The heads of the bolts are sandwiched between the first mudguard member and the second mudguard member and, therefore, the bolts are supported by the mudguard unit. That is, using the divided construction of the mudguard unit as a retainment structure for the bolts facilitates the fastening and releasing of the bolts and the nuts.

The saddle type vehicle is preferably further provided with a connecting member to join the plurality of bolts. The connecting member is arranged between the first mudguard member and the second mudguard member. When fastening or releasing the nuts and bolts, the connecting member prevents the bolts from turning.

The connecting member is preferably secured to the second mudguard member. Thus, the connecting member improves the rigidity of the second mudguard member.

The saddle type vehicle is preferably further provided with a first connecting member and a second connecting member. The plurality of bolts preferably include a first bolt, a second bolt, a third bolt, and a fourth bolt, for example. The second bolt is preferably aligned with the first bolt in the longitudinal direction of the vehicle. The third bolt is spaced apart from the first bolt in the vehicle width direction. The fourth bolt is preferably aligned with the third bolt in the longitudinal direction of the vehicle. The first connecting member joins the first bolt and the second bolt. The second connecting member joins the third bolt and the fourth bolt. The first connecting member and the second connecting member, arranged between the first mudguard member and the second mudguard member, each extend in the longitudinal direction of the vehicle and are arranged with a gap therebetween in the vehicle width direction.

Therefore, the first connecting member prevents the first bolt and the second bolt from turning. Additionally, the second connecting member prevents the third bolt and the fourth bolt from turning. Therefore, other components such as wires may pass between the first connecting member and the second connecting member.

The first connecting member and the second connecting member are preferably secured to the second mudguard member. Therefore, the first connecting member and the second connecting member improve the rigidity of the second mudguard member.

The first mudguard member preferably includes a front portion, a rear portion, and a coupling portion. The front portion includes holes through which the plurality of bolts pass. The rear portion is located rearward of the front portion. The coupling portion joins the front portion and the rear portion. The coupling portion has a smaller width than the rear portion. The second mudguard member extends from a location below the front portion up to a location rearward of a connecting section between the coupling portion and the rear portion. Therefore, the second mudguard member is long enough to extend from a location below the front portion up to a location rearward of the connecting section between the coupling portion and the rear portion to improve the rigidity of the mudguard unit.

Preferred embodiments of the present invention provide a saddle type vehicle equipped with a highly rigid mudguard that is attached to and removed from the vehicle body in one piece, wherein the attaching and removing of the mudguard is easily performed even when a nut with a locking mechanism is used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
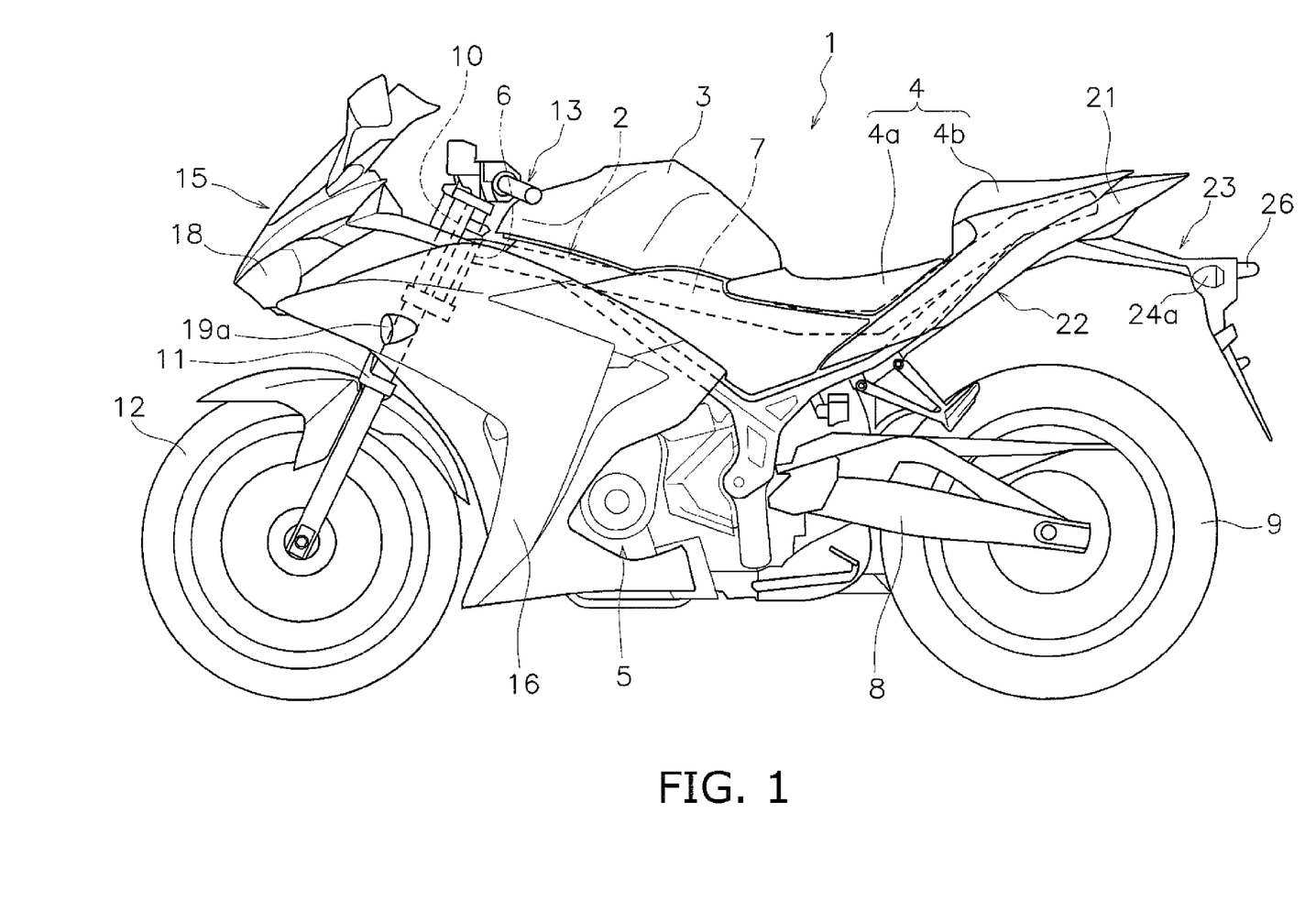
FIG. 1 is a side view of a saddle type vehicle according to a preferred embodiment of the present invention.
Figure 2:
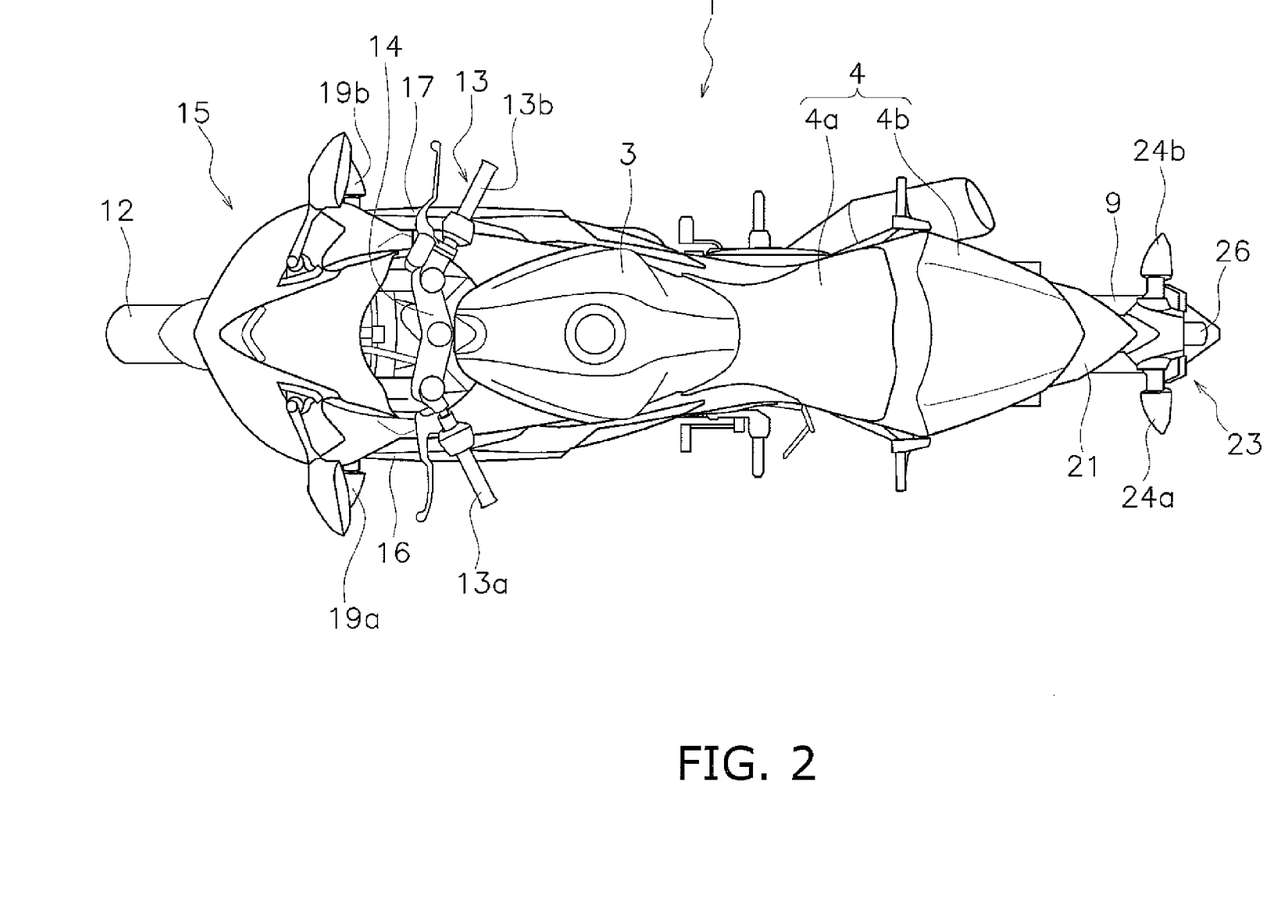
FIG. 2 is a plan view of the saddle type vehicle.

A saddle type vehicle 1 according to preferred embodiments of the present invention is described below with reference to the drawings. FIG. 1 is a side view of the saddle type vehicle 1. FIG. 2 is a plan view of the saddle type vehicle 1. The saddle type vehicle 1 is preferably a so-called sport motorcycle, for example. As illustrated in FIG. 1, the saddle type vehicle 1 includes a vehicle frame 2, a fuel tank 3, a seat 4, an engine 5, a rear arm 8, a rear wheel 9, a steering shaft 10, a front fork 11, and a front wheel 12.

The vehicle frame 2 includes a head pipe 6 and a main frame 7. The head pipe 6 is arranged at the center of the vehicle in the vehicle width direction. The main frame 7 is arranged behind the head pipe 6 and is connected to the head pipe 6. The rear portion of the main frame 7 is arranged above the rear wheel 9 in a side view of the vehicle.

The fuel tank 3 is arranged behind the head pipe 6. The fuel tank 3 is arranged above the main frame 7. The seat 4 is arranged behind the fuel tank 3. The seat 4 is arranged above the main frame 7. The engine 5 is arranged below the fuel tank 3. The engine 5 is supported by the main frame 7. In the present preferred embodiment, the terms front, rear, left, and right mean the front, rear, left, and right as viewed by a rider seated in the seat 4.

The seat 4 includes a main seat 4a and a rear seat 4b. The main seat 4a is arranged behind the fuel tank 3. The rear seat 4b is arranged behind the main seat 4a. The upper surface of the rear seat 4b is located above the upper surface of the main seat 4a. The seat 4 illustrated in FIG. 1 is a dual saddle seat where the main seat 4a and the rear seat 4b are separate, however, the main seat 4a and the rear seat 4b may be unitary.

The rear arm 8 is attached to the main frame 7 and configured to pivot with respect to the main frame 7. The rear wheel 9 is arranged behind the engine 5 and is supported on the main frame 7 via the rear arm 8.

The steering shaft 10 is inserted into the head pipe 6 to rotate about the central axis of the head pipe 6. The front fork 11 is coupled to the steering shaft 10, and extends downward. The front wheel 12 is supported at the lower portion of the front fork 11 and configured to rotate. The engine 5 is arranged behind the front wheel 12.

The saddle type vehicle 1 includes a handle unit 13. The handle unit 13 is coupled to the steering shaft 10. As illustrated in FIG. 2, the handle unit 13 includes a left handle member 13a, a right handle member 13b, and a top bridge 14. The left handle member 13a and the right handle member 13b are mutually separate components and are coupled to the steering shaft 10 via the top bridge 14. In the present preferred embodiment, the handle unit 13 is a so-called separated handlebar, however the handle unit 13 may be a so-called bar handlebar in which the left and right handle member 13a and 13b are unitary.

The saddle type vehicle 1 is a so-called full cowl vehicle including a front cover 15, a first side cover 16, and a second side cover 17. The front cover 15 is arranged in front of the head pipe 6 and the handle unit 13. A front light 18 is arranged in the front cover 15.

The first side cover 16 and the second side cover 17 are each attached to the front cover 15. The first side cover 16 and the second side cover 17 each extend rearward from the front cover 15. The first side cover 16 is arranged on the left side of the engine 5. The second side cover 17 is arranged on the right side of the engine 5. A front-left flasher 19a is arranged on the first side cover 16. A front-right flasher 19b is arranged on the second side cover 17.

The saddle type vehicle 1 includes a rear cover 21 and a rear fender 22. The rear cover 21 is arranged below the rear seat 4b. The rear cover 21 is arranged on both sides of the rear portion of the main frame 7. The rear fender 22 covers the underside of the rear cover 21. The rear fender 22 is arranged above the rear wheel 9.

The saddle type vehicle 1 is equipped with a mudguard unit 23. The mudguard unit 23 is arranged above the rear wheel 9. As illustrated in FIG. 2, the rear wheel 9 preferably has a larger width than the mudguard unit 23. The mudguard unit 23 is attached to the vehicle frame 2. Furthermore, attachment of the mudguard unit 23 to the vehicle frame 2 is not limited to direct attachment to the vehicle frame 2, and includes cases of indirect attachment such as via a bracket or the like. A rear-left flasher 24a and a rear-right flasher 24b are attached to the mudguard unit 23. A license plate (not shown) and a license light 26 are also attached to the mudguard unit 23.

Figure 3:
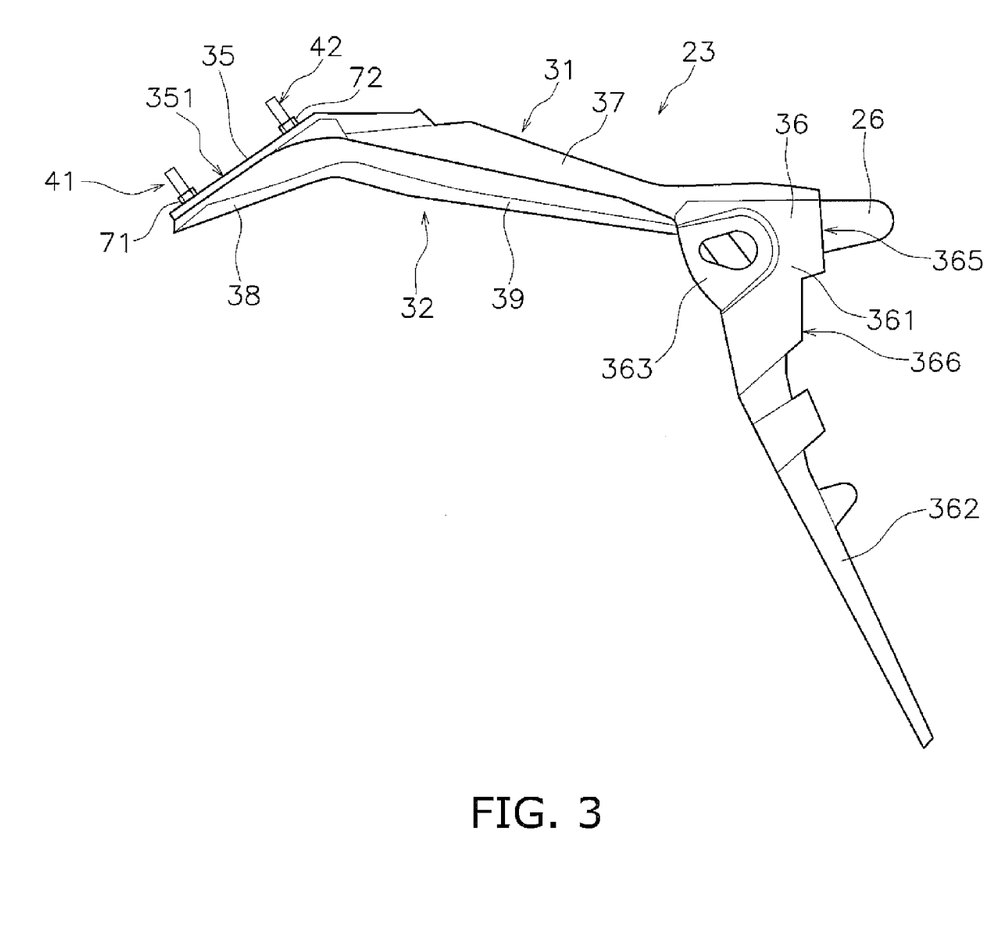
FIG. 3 is a side view of a mudguard unit.
Figure 4:
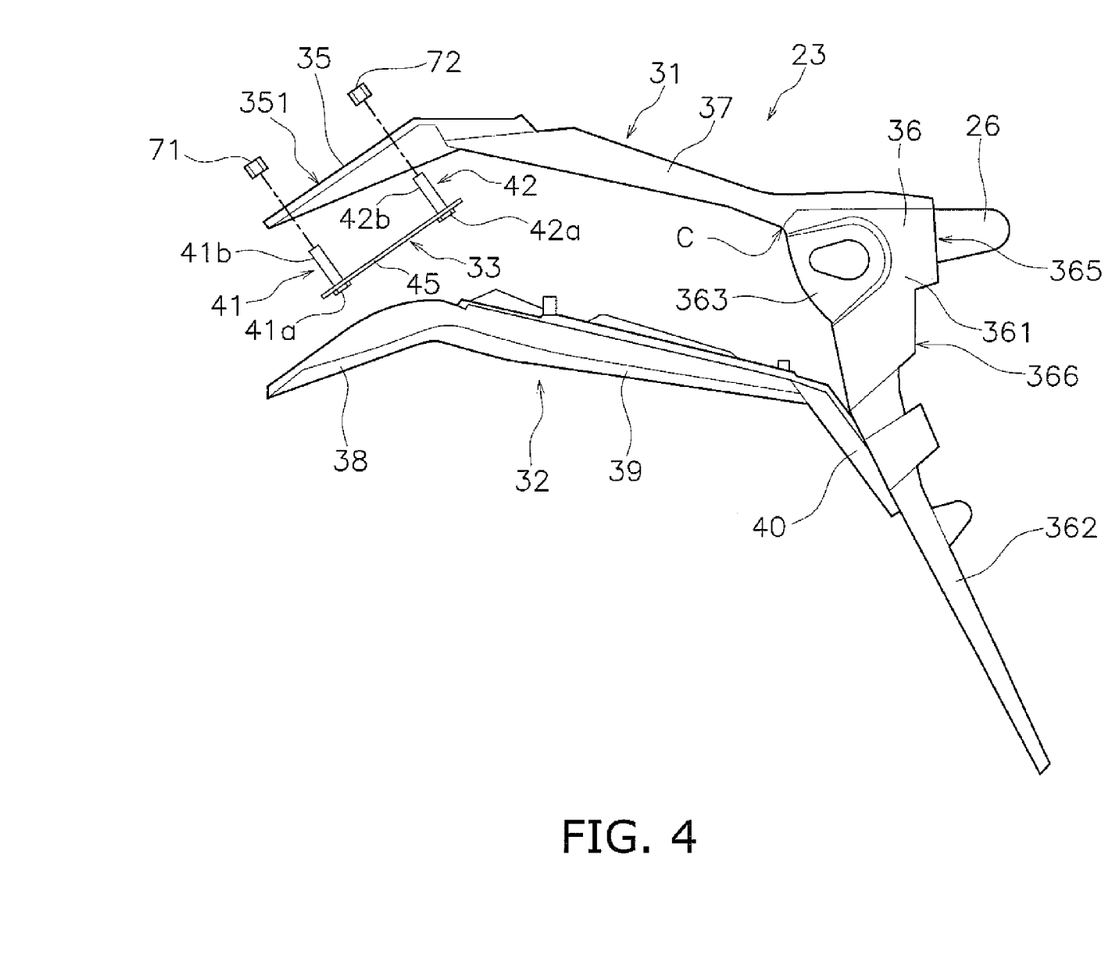
FIG. 4 is an exploded side view of the mudguard unit.
Figure 5:
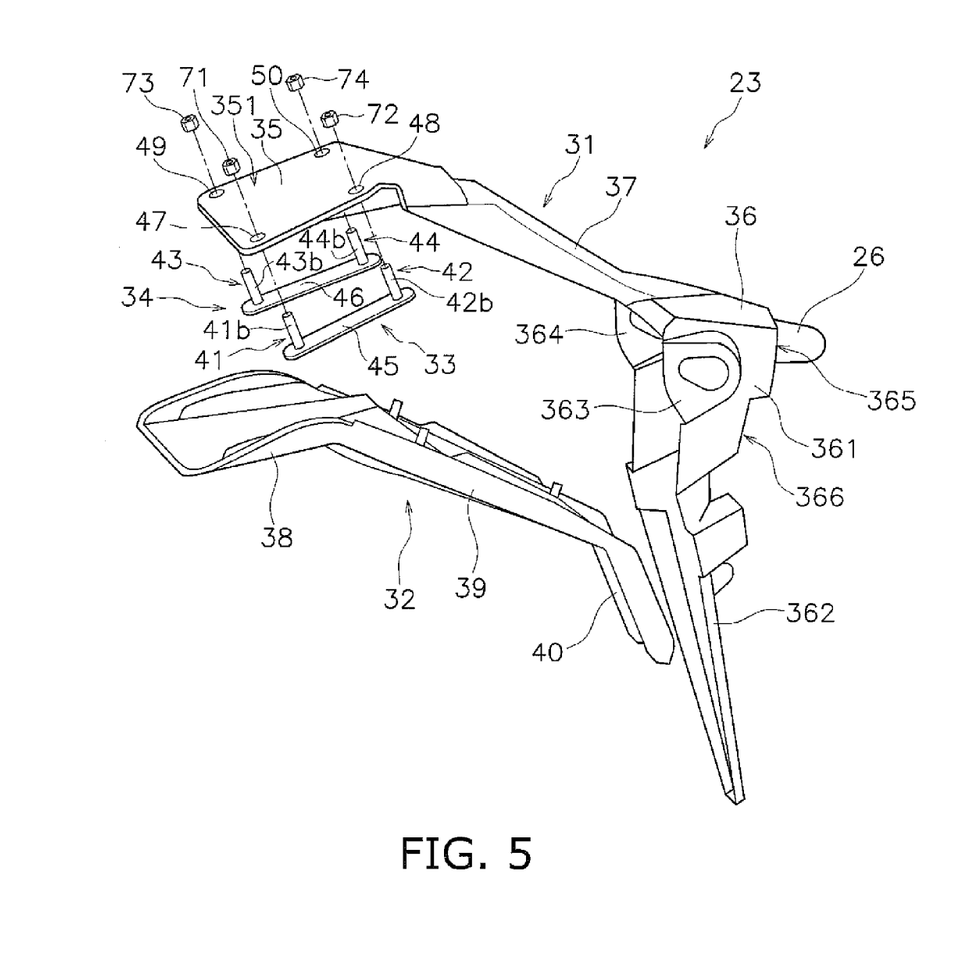
FIG. 5 is an exploded perspective view of the mudguard unit.

FIG. 3 is a side view of the mudguard unit 23. FIG. 4 is an exploded side view of the mudguard unit 23. FIG. 5 is an exploded perspective view of the mudguard unit 23. As illustrated in FIG. 3 through FIG. 5, the mudguard unit 23 includes a first mudguard member 31, a second mudguard member 32, a first fastener member 33, and a second fastener member 34.

The first mudguard member 31 and the second mudguard member 32 are preferably made from resin. The second mudguard member 32 is a separate component from the first mudguard member 31.

The first mudguard member 31 includes a first front portion 35, a first rear portion 36, and a first coupling portion 37. The first front portion 35 includes a first attachment surface 351. The first attachment surface 351 is attached to the rear fender 22. The first rear portion 36 is located rearward of the first front portion 35. The first coupling portion 37 joins the first front portion 35 and the first rear portion 36. The first coupling portion 37 preferably has a smaller width than the first rear portion 36.

The first rear portion 36 includes a main portion 361 and a mudguard portion 362. The mudguard portion 362 extends downward from the main portion 361. As illustrated in FIG. 5, the main portion 361 includes a rear-left flasher attaching portion 363 and a rear-right flasher attaching portion 364. The rear-left flasher attaching portion 363 is provided on the left side surface of the main portion 361. Further, the rear-left flasher 24a is attached to the rear-left flasher attaching portion 363. The rear-right flasher attaching portion 364 is provided on the right side surface of the main portion 361. Further, the rear-right flasher 24b is attached to the rear-right flasher attaching portion 364.

The main portion 361 includes a license light attaching portion 365. The license light attaching portion 365 is provided on the rear surface of the main portion 361. The license light 26 is attached to the license light attaching portion 365. The main portion 361 includes a license plate attaching portion 366. The license plate attaching portion 366 is located below the license light attaching portion 365. The license plate is attached to the license plate attaching portion 366.

The second mudguard member 32 is arranged below the first mudguard member 31. The second mudguard member 32 is attached to the first mudguard member 31. As illustrated in FIG. 4, the second mudguard member 32 extends from a location below the first front portion 35 up to a location rearward of a connecting section C between the first coupling portion 37 and the first rear portion 36. In other words, the second mudguard member 32 extends from a location below the first front portion 35 up to a location below the first rear portion 36.

The second mudguard member 32 includes a second front portion 38, a second coupling portion 39, and a second rear portion 40. The second front portion 38 is arranged below the first front portion 35. The second coupling portion 39 is arranged behind the second front portion 38, and joins the second front portion 38 and the second rear portion 40. The second rear portion 40 is arranged behind the second coupling portion 39. As illustrated in FIG. 5, the front surface of the main portion 361 is open, and the second rear portion 40 covers the opening of the main portion 361 from the front. The lower end of the second rear portion 40 is located above the lower end of the first rear portion 36.

The first fastener member 33 and the second fastener member 34 are configured to attach the mudguard unit 23 to the vehicle frame 2. The first fastener member 33 and the second fastener member 34 are preferably mutually separate components. The first fastener member 33 and the second fastener member 34 are preferably made from metal, for example. However, the first fastener member 33 and the second fastener member 34 may be made using materials other than metal.

The first fastener member 33 preferably includes a first bolt 41, a second bolt 42, and a first connecting member 45, for example. The second bolt 42 is preferably aligned with the first bolt 41 in the longitudinal direction of the vehicle. The first connecting member 45 preferably has a long and narrow shape in the longitudinal direction of the vehicle. The first connecting member 45 extends in the longitudinal direction of the vehicle, and joins the first bolt 41 and the second bolt 42. The first bolt 41 and the second bolt 42 are preferably welded to the first fastener member 33, for example. However, the first bolt 41 and the second bolt 42 may be made unitary with the first fastener member 33 by a process other than welding.

The second fastener member 34 includes a third bolt 43, a fourth bolt 44, and a second connecting member 46. The third bolt 43 is spaced apart from the first bolt 41 in the vehicle width direction. The fourth bolt 44 is preferably aligned with the third bolt 43 in the longitudinal direction of the vehicle. The second connecting member 46 preferably has a long and narrow shape in the longitudinal direction of the vehicle. The second connecting member 46 extends in the longitudinal direction of the vehicle, and joins the third bolt 43 and the fourth bolt 44. The third bolt 43 and the fourth bolt 44 are preferably welded to the second fastener member 34. However, the third bolt 43 and the fourth bolt 44 may be made unitary with the second fastener member 34 by a process other than welding.

The first connecting member 45 and the second connecting member 46 are arranged with a gap therebetween in the vehicle width direction. The first connecting member 45 and the second connecting member 46 are arranged between the first mudguard member 31 and the second mudguard member 32. The first connecting member 45 and the second connecting member 46 are secured to the second mudguard member 32. The first front portion 35 includes holes 47 to 50 through which the first through fourth bolts 41 to 44 pass.

As illustrated in FIG. 4, the first bolt 41 includes a head 41a and a male screw 41b. The second bolt 42 includes a head 42a and a male screw 42b. The heads 41a and 42a are sandwiched between the first mudguard member 31 and the second mudguard member 32. The male screws 41a and 42b are inserted through holes 47 and 48 in the first front portion 35 respectively, and protrude upward from the first mudguard member 31.

As illustrated in FIG. 5, the third bolt 43 includes a head (not shown) and a male screw 43b. The fourth bolt 44 also includes a head (not shown) and a male screw 44b. Though not illustrated, the head of the third bolt 43 and the head of the fourth bolt 44 are sandwiched between the first mudguard member 31 and the second mudguard member 32. The male screws 43a and 44b are inserted through holes 49 and 50 in the first front portion 35 respectively, and protrude upward from the first mudguard member 31.

Figure 6:
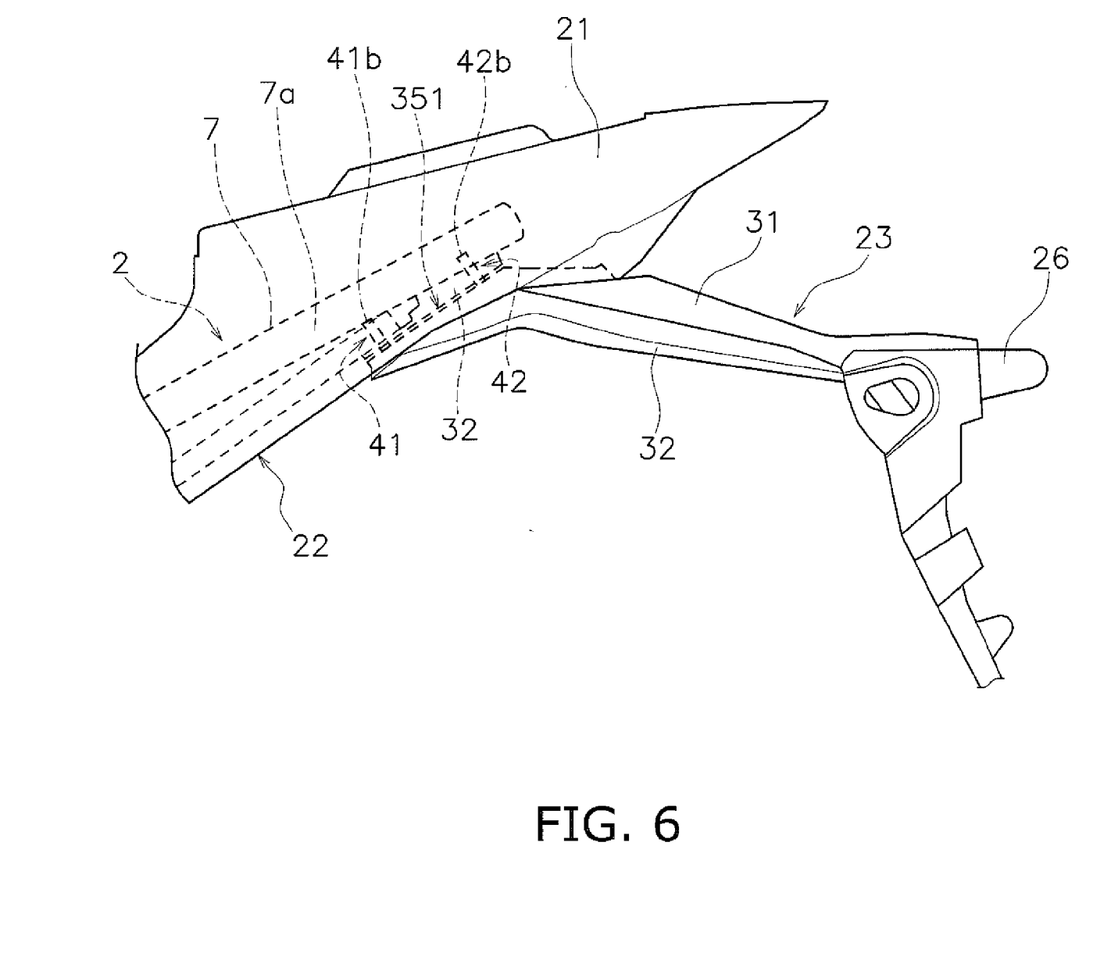
FIG. 6 is a side view of the rear portion of the saddle type vehicle.
Figure 7:
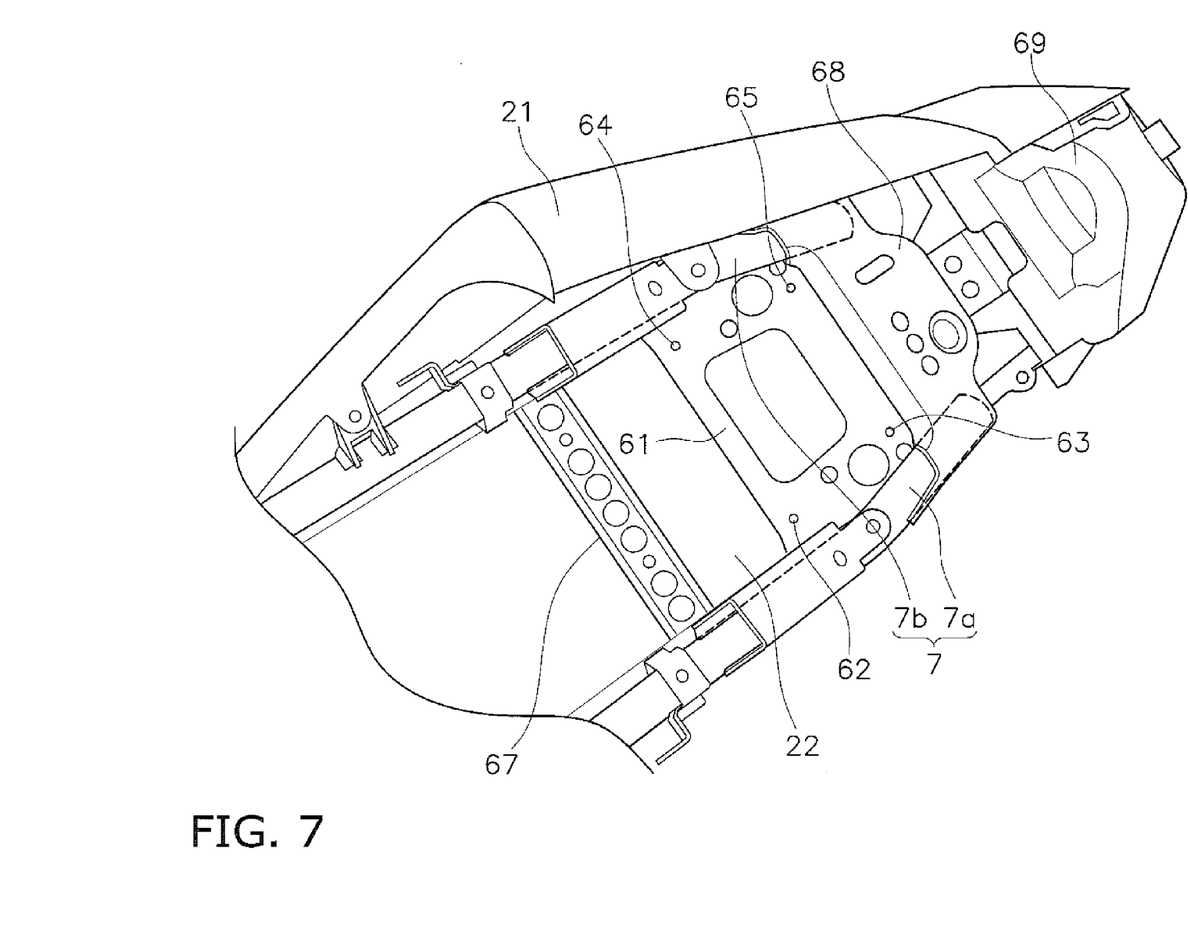
FIG. 7 is a plan view illustrating the internal structure of the rear portion of the saddle type vehicle.

FIG. 6 is a side view of the rear portion of the saddle type vehicle 1. FIG. 7 is a plan view illustrating the internal structure of the rear portion of saddle type vehicle 1. Portions of these elements are omitted from FIG. 7 to facilitate understanding.

As illustrated in FIG. 6 and FIG. 7, the vehicle frame 2 includes a mudguard attaching portion 61. The mudguard attaching portion 61 includes a plurality of holes 62 to 65. The plurality of holes 62 to 65 pass vertically through the mudguard attaching portion 61. The above described first through fourth bolts 41 to 44 pass through the plurality of holes 62 to 65. The above described rear fender 22 includes a plurality of holes (not shown), wherein the plurality of holes in the rear fender 22 are arranged to correspond to the locations of the plurality of holes in the mudguard attaching portion 61.

More specifically, as illustrated in FIG. 7, the main frame 7 includes a left main frame 7a and a right main frame 7b. The left main frame 7a and the right main frame 7b are arranged spaced apart in the vehicle width direction. The mudguard attaching portion 61 is arranged to span the left main frame 7a and the right main frame 7b. The holes 62 to 65 in the mudguard attaching portion 61 are arranged between the left main frame 7a and the right main frame 7b.

The vehicle frame 2 also includes a first cross member 67 and a second cross member 68. The first cross member 67 and the second cross member 68 are arranged to span the left main frame 7a and the right main frame 7b. The second cross member 68 is arranged behind the first cross member 67. The mudguard attaching portion 61 is arranged between the first cross member 67 and the second cross member 68 in the longitudinal direction of the vehicle. A tail light unit 69 is arranged behind the second cross member 68.

As illustrated in FIG. 4 and FIG. 5, the mudguard unit 23 is secured to the vehicle frame 2 using a plurality of nuts 71 to 74. More specifically, the mudguard unit 23 is secured to the vehicle frame 2 using a first nut 71, a second nut 72, a third nut 73, and a fourth nut 74. The first nut 71 is tightened onto the first bolt 41. The second nut 72 is tightened onto the second bolt 42. The third nut 73 is tightened onto the third bolt 43. The fourth nut 74 is tightened onto the fourth bolt 44. The first through fourth nuts 71 to 74 are separate components each including a locking mechanism. The locking mechanism is preferably, for example, a friction component that comes into contact with the male screws 41b to 44b of the first through fourth bolts 41 to 44.

Next, a non-limiting example of a method of attaching the mudguard unit 23 is described. As described above, the male screws 41b to 44b of the first through fourth bolts 41 to 44 protrude upward from the first front portion 35 of the mudguard unit 23. The male screws 41b to 44b pass from below through the holes in the rear fender 22 and the holes 62 to 65 in the mudguard attaching portion 61. Therefore, the tip ends of the male screws 41b to 44b protrude upward from the holes 62 to 65 in the mudguard attaching portion 61. The first through fourth nuts 71 to 74 are tightened onto the male screws 41b to 44b of the first through fourth bolts 41 to 44 above the mudguard attaching portion 61. The mudguard unit 23 is thus secured to the mudguard attaching portion 61.

The mudguard unit 23 in the saddle type vehicle 1 according to the present preferred embodiment uses a construction vertically divided into the first mudguard member 31 and the second mudguard member 32. The vertically divided construction improves the rigidity of the mudguard unit 23.

Furthermore, the male screws 41 to 44 of the bolts 41 to 44 protrude upward from the first mudguard member 31, and the second mudguard member 32 is attached to the first mudguard member 31. Therefore, the mudguard unit 23 is attached or removed in one piece by fastening or releasing the bolts 41 to 44 and the nuts 71 to 74.

Moreover, the bolts 41 to 44 are accessed from above the bolts since the nuts 71 to 74 are tightened onto the male screws 41 to 44 of the bolts 41 to 44 above the mudguard attaching portion 61. Therefore, the rear wheel 9 does not impede attaching the mudguard unit 23, thus improving the efficiency of attaching the mudguard.

The heads of the bolts 41 to 44 are sandwiched between the first mudguard member 31 and the second mudguard member 32 and, therefore, the bolts 41 to 44 are supported by the mudguard unit 23. That is, using the divided construction of the mudguard unit 23 as a retainment structure for the bolts 41 to 44 facilitates the fastening and releasing of the bolts 41 to 44 and the nuts 71 to 74.

The first bolt 41 and the second bolt 42 are joined via the first connecting member 45. Therefore, the first connecting member 45 prevents the first bolt 41 and the second bolt 42 from turning. The third bolt 43 and the fourth bolt 44 are joined via the second connecting member 46. Therefore, the second connecting member 46 prevents the third bolt 43 and the fourth bolt 44 from turning.

Although the first bolt 41 and the second bolt 42 are joined via the first connecting member 45, the first nut 71 and the second nut 72 are mutually separate components. Additionally, although the third bolt 43 and the fourth bolt 44 are joined via the second connecting member 46, the third nut 73 and the fourth nut 74 are mutually separate components. Thus, the influence of any welding on the locking mechanism of the nuts 71 to 74 is prevented compared to when, for instance, the first through fourth nuts are welded to a stay and the like. Moreover, the first through fourth nuts 71 to 74 are arranged above the mudguard attaching portion 61 and, therefore, attachment of the mudguard is easy even if the nuts 71 to 74 are mutually separate components.

The first connecting member 45 and the second connecting member 46 are spaced apart from each other in the vehicle width direction. Therefore, other components such as wires may pass between the first connecting member 45 and the second connecting member 46. For instance, the electrical wire connected to the license light 26 is preferably arranged between the first connecting member 45 and the second connecting member 46. Alternatively or additionally, the electrical wires connected to the rear-left and rear-right flashers 24a and 24b may be arranged between the first connecting member 45 and the second connecting member 46.

The first connecting member 45 and the second connecting member 46 are secured to the second mudguard member 32. Therefore, the first connecting member 45 and the second connecting member 46 improve the rigidity of the second mudguard member 32.

The second mudguard member 32 is long enough to extend from a location below the first front portion 35 to a location rearward of the connecting section C between the first coupling portion 37 and the first rear portion 36. Therefore, the rigidity of the mudguard unit 23 is improved.

This ends a description of one possible preferred embodiment of the present invention. However, the present invention is not limited to the above preferred embodiments, and may be modified in various ways insofar as the modifications do not depart from the spirit and scope of the present invention.

The saddle type vehicle is not limited to a motorcycle, and includes an all-terrain vehicle, recreational off-highway vehicle, or a snowmobile, for example. Additionally, a motorcycle is not limited to a sport motorcycle, and includes a scooter and a moped, for example.

The number of bolts and nuts configured to secure the mudguard unit 23 is not limited to four, and the number of bolts and nuts used may be fewer or greater than four. The first connecting member 45 and the second connecting member 46 may be omitted. That is, the first through fourth bolts 41 to 44 may be separate components.

The first connecting member 45 and the second connecting member 46 are not limited to being secured to the second mudguard member 32, and the first connecting member 45 and the second connecting member 46 may be secured to the first mudguard member 31.

The first mudguard member 31 and the second mudguard member 32 are not limited to the shapes illustrated in the above described preferred embodiments, and the shape of the first mudguard member 31 and the second mudguard member 32 may be modified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle type vehicle comprising:
a rear wheel;
a vehicle frame arranged above the rear wheel in a side view of the vehicle;

a mudguard unit arranged above the rear wheel and attached to the vehicle frame; and a plurality of nuts configured to secure the mudguard unit to the vehicle frame;

wherein the mudguard unit includes:

a first mudguard member made from resin;

a second mudguard member made from resin, the second mudguard member being a separate component from the first mudguard member, and the second mudguard member being configured to be attached to the first mudguard member from below the first mudguard member; and a plurality of bolts, each of the plurality of bolts including a head sandwiched between the first mudguard member and the second mudguard member and a male screw protruding upward from the first mudguard member;

the vehicle frame includes an attaching portion provided with a plurality of holes through which the plurality of bolts pass;

the plurality of nuts are mutually separate components, and each of the plurality of nuts includes a locking mechanism; and the plurality of nuts are configured to be tightened onto the male screws of the plurality of bolts above the attaching portion to secure the mudguard unit to the attaching portion.

2. The saddle type vehicle according to claim 1, further comprising a connecting member configured to join the plurality of bolts, wherein the connecting member is arranged between the first mudguard member and the second mudguard member.

3. The saddle type vehicle according to claim 2, wherein the connecting member is secured to the second mudguard member.

4. The saddle type vehicle according to claim 1, further comprising:

a first connecting member and a second connecting member; wherein the plurality of bolts include:

a first bolt;

a second bolt aligned with the first bolt in a longitudinal direction of the vehicle;

a third bolt spaced apart from the first bolt in a vehicle width direction; and a fourth bolt aligned with the third bolt in the longitudinal direction of the vehicle;

the first connecting member is configured to join the first bolt and the second bolt;

the second connecting member is configured to join the third bolt and the fourth bolt; and the first connecting member and the second connecting member are arranged between the first mudguard member and the second mudguard member, extend in the longitudinal direction of the vehicle, and are arranged with a gap therebetween in the vehicle width direction.

5. The saddle type vehicle according to claim 4, wherein the first connecting member and the second connecting member are secured to the second mudguard member.

6. The saddle type vehicle according to claim 1, wherein:

the first mudguard member includes:

a front portion including holes through which the plurality of bolts pass;

a rear portion located rearward of the front portion; and a coupling portion joining the front portion and the rear portion, and a width of the coupling portion being smaller than a width of the rear portion; and the second mudguard member extends from a location below the front portion up to a location rearward of a connecting section between the coupling portion and the rear portion.

7. The saddle type vehicle according to claim 1, wherein the mudguard unit is attached to the vehicle frame from below the vehicle frame.

* * * * *